United States Patent
Ketonen et al.

(10) Patent No.: US 6,349,268 B1
(45) Date of Patent: Feb. 19, 2002

(54) METHOD AND APPARATUS FOR PROVIDING A REAL TIME ESTIMATE OF A LIFE TIME FOR CRITICAL COMPONENTS IN A COMMUNICATION SYSTEM

(75) Inventors: Veli-Pekka Ketonen, Irving; Steven J. Laureanti, Lewisville, both of TX (US)

(73) Assignee: Nokia Telecommunications, Inc., Espoo (FI)

( * ) Notice: Subject to any disclaimer, the term of this patent is extended or adjusted under 35 U.S.C. 154(b) by 0 days.

(21) Appl. No.: 09/281,523

(22) Filed: Mar. 30, 1999

(51) Int. Cl.[7] .............................. G01K 1/00; G06F 15/00
(52) U.S. Cl. ...................... 702/130; 702/182; 702/184; 340/588
(58) Field of Search ................................ 702/130, 182, 702/186, 187; 324/754, 760–765; 340/588, 589

(56) References Cited

U.S. PATENT DOCUMENTS

| | | | | |
|---|---|---|---|---|
| 4,525,763 A | * | 6/1985 | Hardy et al. ................ 324/772 |
| 4,647,219 A | * | 3/1987 | Figler et al. ................ 340/588 |
| 5,867,809 A | * | 2/1999 | Soga et al. ................. 702/130 |
| 5,926,777 A | * | 7/1999 | Vink et al. ................. 702/187 |

* cited by examiner

Primary Examiner—Hal Wachsman
Assistant Examiner—Bryan Bui
(74) Attorney, Agent, or Firm—Altera Law Group, LLC

(57) ABSTRACT

A system and method of predicting a life time of a device and determining a life time left for the device, includes a temperature sensor, disposed proximate to the device, sensing temperatures of the device at a plurality of time intervals; a memory, coupled to the sensor, recording the sensed temperatures from the sensor; and a controller, coupled to the memory, determining life time points of the device corresponding to the temperatures, calculating accumulated life time points of the device on account for the time intervals to predict the life time of the device. In operation, given a measured temperature, a life time left for the device is determined. Accordingly, the device can be replaced by a new device before it fails, thereby improving reliability of a system, such as a communication system at BTS (Base Transceiver Station).

15 Claims, 4 Drawing Sheets

METHOD AND APPARATUS FOR PROVIDING A REAL TIME ESTIMATE OF A LIFE TIME FOR CRITICAL COMPONENTS IN A COMMUNICATION SYSTEM

BACKGROUND OF THE INVENTION

1. Field of the Invention

This invention relates in general to a method and system for estimating the life time of a device, and more particularly, to estimation of the life time of a device in a communication system.

2. Description of Related Art

The state of communications technology is currently in flux and subject to rapid and often uncoordinated growth. The ubiquity and diversity of communication devices have placed significant pressure on the providers of communications system infrastructure to accommodate the alarming increase in the number of new users that demand immediate and reliable access to network resources. The rapid development of new and sophisticated software made available to users of such services places additional demands on system infrastructure.

In spite of the rapid and vast development of the communication technology, reliability of devices used in a communication system in practice is still a main concern. Some electronic devices used in the system require a very high reliability. One of the applications of a communication system is a cellular base station. Failures of the electronic devices in the system would directly reduce usability and may cause simultaneous unavailability of a network operation. A typical application of such electronic devices is a base station power amplifier. Accordingly, failure of a base station is undesirable since this would result in unavailability of the network thereby causing, for example, lost revenue to the network provider and serious emergency circumstances where a caller could not report an emergency or request emergency aid.

A high junction temperature is in practice inevitable when there is a need for high power at radio frequencies. However, a decrease in reliability of some electronic devices is often related to operating the devices with a high junction temperature. For example, power amplifiers used in the communication system include semiconductor components such as BJT (Bipolar Junction Transistor) devices, FET (Field Effect Transistor) devices, etc., which have degraded reliability when operating in a high temperature environment with high power levels.

There is no commonly known apparatus and/or method that is capable of predicting a MTTF (Mean Time To Failure) of a device. The MTTF is generally defined as an average time for a hardware breakdown or loss of service. Usually, MTTF calculations use some assumptions based on an average ambient temperature. Also, the ambient temperature is often considered to be evenly distributed. These kinds of methods fail to predict a MTTF in practical applications because they do not take into account the operating temperature of a device, such as the practical junction temperature of a semiconductor device. The practical junction temperature depends, as an example, on the following, but not limited to, factors:

1) Unit or device location in a BTS (Base Transceiver Station) rack: Cooling is not evenly distributed within a BTS cabinet.
2) Type of a BTS rack: Outdoor and indoor cabinets have different properties.
3) BTS location: Geographically hot areas or directly under sun installation have a higher temperature inside the BTS.
4) Ambient temperature variations: Some areas have higher ambient temperature variations than other areas.
5) Used transmitted power: If there is a high incoming power to a device (BJT,FET, etc. . . . ), the device will have a higher junction temperature. On the other hand, a needed output power depends, e.g. in cellular applications, on the size of a cell. The bigger a cell, the more power is needed.
6) Some power amplifier devices are biased such that their DC power usage (at the bias point) and junction temperature depend also on a needed signal power at an output of the devices.
7) The amount of traffic: Because the practical junction temperature depends on the needed output power, the more the traffic in a system, e.g. a time duplexed system (e.g. TDMA, Time Division Multiple Access), the higher the practical junction temperature is.

Accordingly, it can be seen that there is a need for a system and method for following and estimating a life time for high risk devices or components or modules of a system, such as a communication system, such that devices or components or modules in the system can be replaced before they fail.

SUMMARY OF THE INVENTION

To overcome the limitations described above, and to overcome other limitations that will become apparent upon reading and understanding the present specification, the present invention is directed to estimation of a life time of a device.

The present invention provides a system that measures the temperatures of critical components, modules or devices. The system predicts the life time of the device based on the measurements. The system also determines a life time left for a device in a real operational environment.

In one embodiment of the present invention, a system of estimating a life time of a device, includes a temperature sensor, disposed proximate to the device, sensing temperatures of the device at a plurality of time intervals, a memory, coupled to the temperature sensor, recording the sensed temperatures and a controller, coupled to the memory, determining life time points of the device corresponding to the temperatures, calculating accumulated life time points of the device on account for the time intervals to predict the life time of the device.

Other embodiments of a system in accordance with the principles of the invention may include alternative or optional additional aspects. One such aspect of the present invention is that for a temperature at an operation time of the device, the controller determines a life time left for the device.

Additional aspect of the present invention is that the life time points corresponding to the temperatures are predetermined, the controller eliminating life time left for the device based upon the life time of the device and the life time points accumulated.

Additional aspect of the present invention is that the device is high power semiconductor.

Additional aspect of the present invention is that the high power semiconductor includes a heat sink, the temperature sensor being mounted on the heat sink of the high power semiconductor.

Additional aspect of the present invention is that the device includes a heat sink, the temperature sensor is mounted on the heat sink.

Additional aspect of the present invention is that the memory includes a database, the database including life time data.

Additional aspect of the present invention is that the life time data is obtained from field tests.

Additional aspect of the present invention is that the memory includes a model for modeling a life time of a device.

Additional aspect of the present invention is that the model and the database are based on real time data collection.

Still another aspect of the invention includes an article of manufacture for a computer-based estimating system for estimating a life time of a device. The article of manufacture includes a computer readable medium having instructions for causing a computer to perform a method, where the method includes sensing a temperature of a device, recording the temperatures of the device at a plurality of time intervals, determining life time points of the device corresponding to the temperatures, calculating accumulated life time points of the device for the time intervals, and predicting a life time for the device based upon the accumulated life time points.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides estimation of a life time of a device in a communication system. In the present invention, the temperature of a device, such as a semiconductor device used in a communication system, is measured, and the life time of the device is predicted based on the measured temperatures and the corresponding life time points. The present invention also determines a life time left for a device, given a sensed temperature of the device at an operation time, thereby making it possible to replace the device with a new device before the device reaches its life time.

Figure 1:
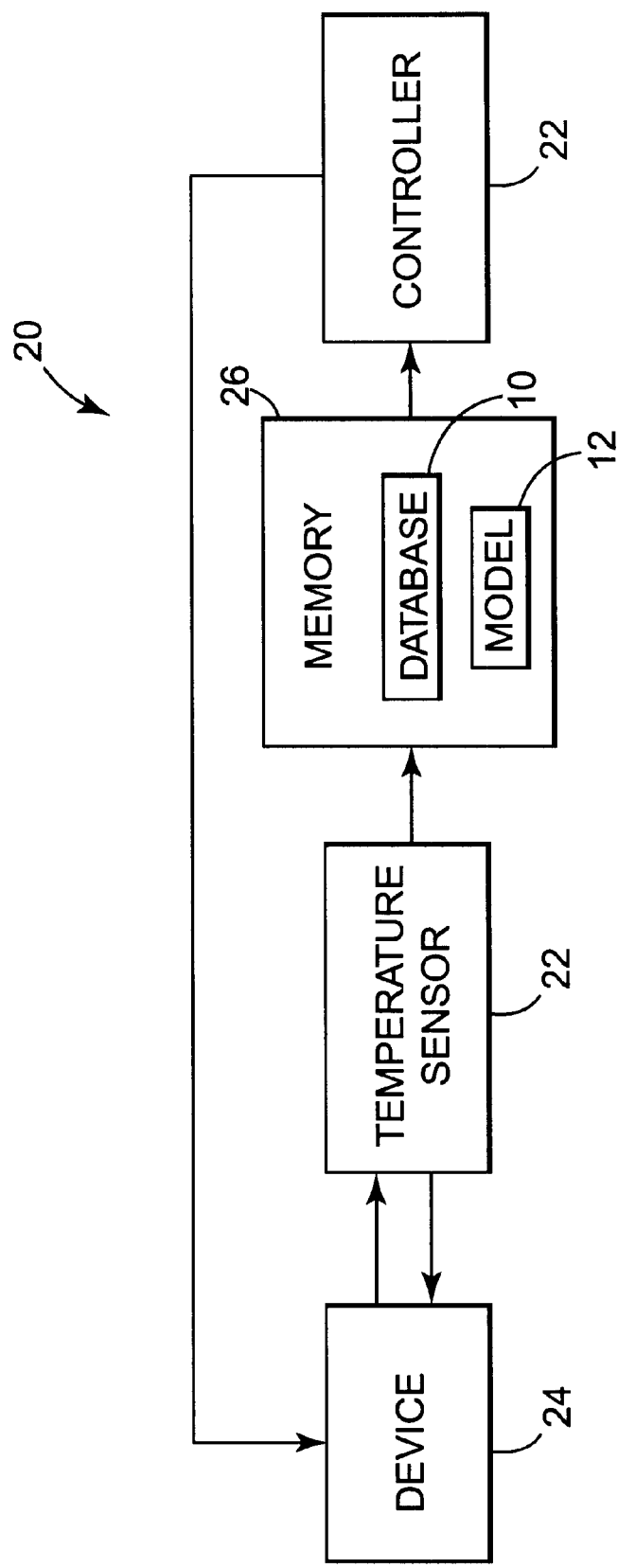
FIG. 1 illustrates a block diagram of a life time estimate system for predicting a life time of a device in accordance with the principles of the present invention.

In FIG. 1, a life time estimate system 20 is illustrated in a block diagram. The system 20 includes a temperature sensor 22. The sensor 22 senses the temperature of a device 24. The measured temperatures are recorded in a memory 26 which is coupled to a controller 28. The controller 28 determines the life time points corresponding to the temperatures at a plurality of time intervals to predict a life time of the device. When the device is used in a true operational environment, such as a BTS (Base Transceiver Station), given a sensed temperature, a life time left for the device can be determined.

Figure 2:
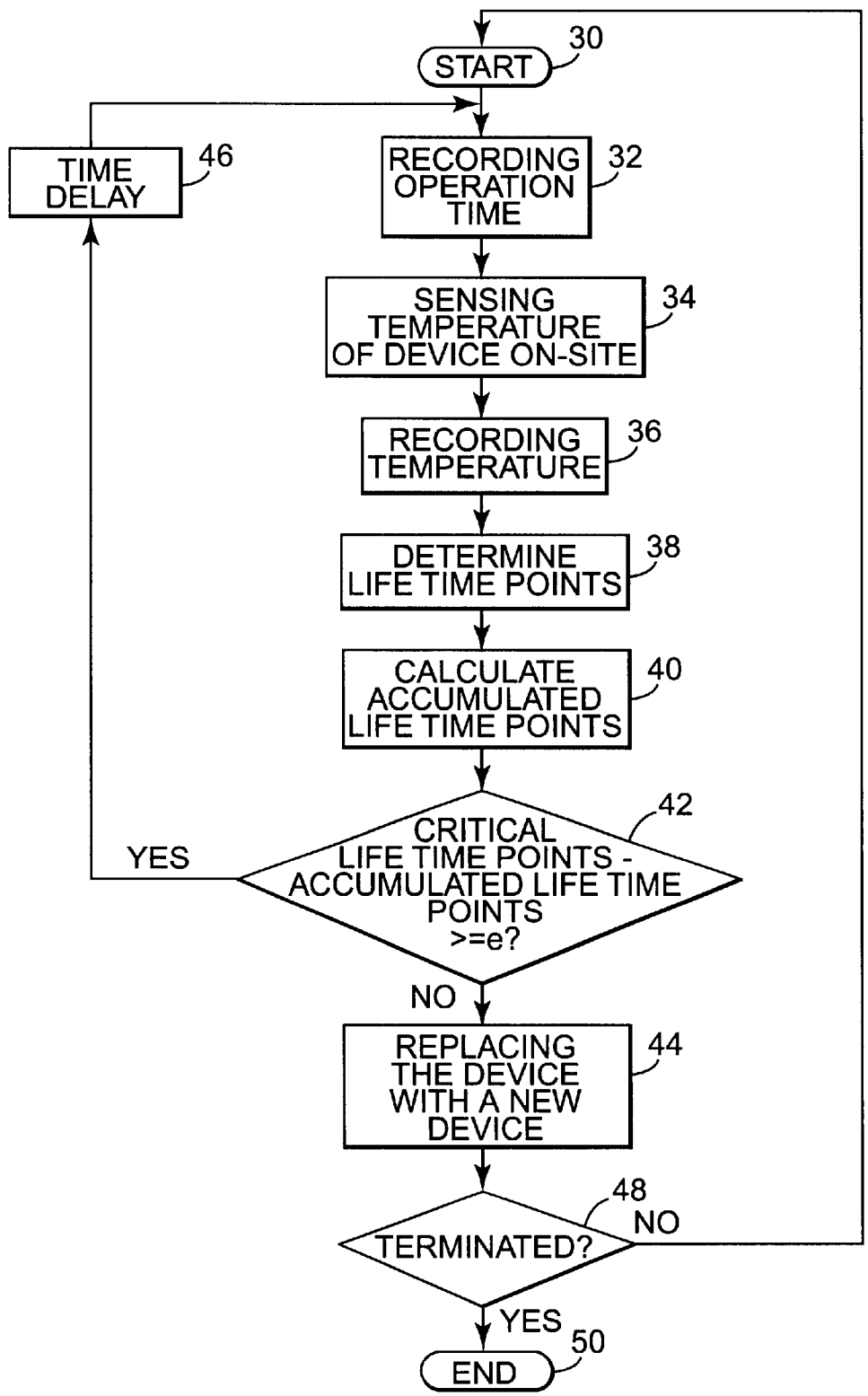
FIG. 2 illustrates a flow chart of a method for predicting a life time of a device and determining a life time left for a device in accordance with the principles of the present invention.

FIG. 2 illustrates an exemplary operation of estimating the life time of the device in a flow chart. It is appreciated that other operations can be implemented within the scope of the invention. It is also appreciated that the sequence of the operation shown can be varied without departing from the principles of the invention. The operation starts in box 30. In box 32, the operation time of the device is recorded so that the time, running from when the power to the device is turned on to when the measurement is made, is recorded. The temperature sensor senses the junction temperatures of the device at a plurality of time intervals in box 34. The measured temperatures are recorded in the memory in box 36. Based on the measured temperatures, the controller determines the life time points corresponding to the temperatures in box 38 and the accumulated life time points in box 40. A life time of a device is predicted based on the life time points and accumulated life time points (see example below). The life time may vary with the changes of the temperature. Based on a plurality of measurements with a variety of different temperatures and time intervals, the operation of the device under different temperatures is modeled. The device operated in a higher temperature has a shorter life time than the device operated in a lower temperature. In a real operation, the operation also runs from box 30 to box 40. Given a measured temperature of the device, the controller determines whether the accumulated life time points have reached critical life time points which correspond to the life time predicted. A constant, e, can be predetermined. For example, the constant, e, can be two time intervals, etc. Thus, once the accumulated life time points have reached the critical life time points and short of two time intervals, the operation proceeds in the "NO" path, and the device is replaced by a new device in box 44. If the accumulated life time points have not reached the critical life time points, the operation proceeds in the "YES" path, and the operation continues on in box 32. A time delay in box 46 may be added in the "YES" path to synchronize the temperature measurement's time interval. After replacing the device, the operation determines whether the operation should be terminated in box 48: if "YES", then the operation ends in box 50; if "NO", then the operation for the new device starts again in box 30.

The MTTF (Mean Time To Failure) can be used to define a life time of a device. The MTTF can be derived from theoretical calculations or from device manufacturer reliability data. For example, the MTTF theoretically be predicted by the following equation (1):

$$MTTF(\text{hrs}) = \frac{(t*W*2.54*10^{-7})^3 *n^2}{BI^2} *\exp\left(\frac{\Phi}{kT}\right)$$

where t=metal thickness in microns, W=finger width in mils, T=temperature in Kelvin, I=current in Ampers, n=total number of fingers, k=Boltzmans constant=$8.625*10^{-5}$ eV, $\Phi$=die metalization activation energy, and B=die metalization bulk constant.

To simplify calculation for demonstration purposes, X can be defined as follows:

$$\frac{(t*W*2.54*10^{-7})^3 *n^2}{BI^2} = X$$

Thus, the value X is dependent on device properties, e.g., a semiconductor device, and equation (1) becomes as follows:

$$MTTF(\text{hrs}) = X *\exp\left(\frac{\Phi}{k*(C+273.2)}\right)$$

where, as an example, $X=2.0*10^{-13}$, and $\Phi=1.6$ eV. The MTTF is about 120,000 hours at constant 180° C. temperature.

The MTTF calculation principle may be based on the following procedure. Those skilled in the art will recognize that the example below is provided only for illustration and that other examples in accordance with the present invention are possible.

One example of accumulated life time points can be calculated as shown in Table 1.

TABLE 1

| Measurement from turn on | Sensed/ Measured temperature | Life time points = $10^9$/(MTTF @ temp) | Life time point Accumulated sum |
|---|---|---|---|
| 2 min | 180° C. | 8400 | 8400 |
| 4 min | 160° C. | 1300 | 9700 |
| 6 min | 140° C. | 160 | 9860 |
| 8 min | 180° C. | 8400 | 18260 |
| 10 min | 180° C. | 8400 | 26660 |

In Table 1, the first column is the time running from the time that the power to the device is turned on. The second column is the measured temperatures. The third column is the life time points for the device corresponding to the measured temperatures. The life time points for the corresponding temperatures are determined after a plurality of experimental tests and/or modeling of the device and based on field information. The higher the temperature, the more "wear and tear" the device has, in other words, the more life time points, thereby a shorter life time. The fourth column is the sum of the life time points from the measurements in the past, i.e. the accumulated life time points. It is appreciated that the temperature can be an average of measured temperatures over a time interval or a temperature at the time of the measurement. It is also appreciated that other additional statistics can also be used from the experimental tests or modeling within the scope of the invention.

Table 2 illustrates the corresponding relationship between a temperature and the life time points of the device. For example, under a temperature of 180° C., the life time points of the device is determined to be 8400 after a plurality of experimental tests and/or modeling based on true field data. The numbers in the "Life time points" column of Table 2 are relative to each other and are selected as an example to reflect the relationship, known in the statistics and modeling art. It is appreciated that other types of arrangement for the life time points can be used within the scope of the invention. The relationship between the temperatures and the life points reflects the dynamic life time (temperature vs. time) of a device. Also, it is noted that the "wear and tear" scale is also nonlinear, and typically logarithmic. For example, 10° C. increase from 160° C. to 170° C. is much more harmful, with two thousand life time points increase (3300–1300=2000), than 10° C. increase from 100° C. to 110° C., with 3.4 life time point increase (4.7–1.3–3.4).

Life time points as illustrated, for example, in Table 2 may be implemented in a database 10. For example, this database 10 may be implemented in the memory 26 as illustrated in FIG. 1. This database 10 may be updated based on the data from the field and a model 12 for the life time of a device may be constructed based on this field data. Further, this database 26 containing the model and the model may be based on a life time estimate system 20 that collects data and updates estimates in real time.

TABLE 2

| Temperature | Life time points/2 min |
|---|---|
| 180° C. | 8400 |
| 170° C. | 3300 |
| 160° C. | 1300 |
| 150° C. | 460 |
| 140° C. | 160 |
| 130° C. | 52 |
| 120° C. | 16 |
| 110° C. | 4.7 |
| 100° C. | 1.3 |
| 90° C. | 0.33 |
| 80° C. | 0.077 |
| 70° C. | 0.017 |
| 60° C. | 0.0033 |
| 50° C. | 0.00059 |
| 40° C. | 0.000095 |
| 30° C. | 0.000013 |
| 20° C. | 0.0000017 |
| 10° C. | 0.0000018 |
| 0° C. | 0.000000016 |

Figure 3:
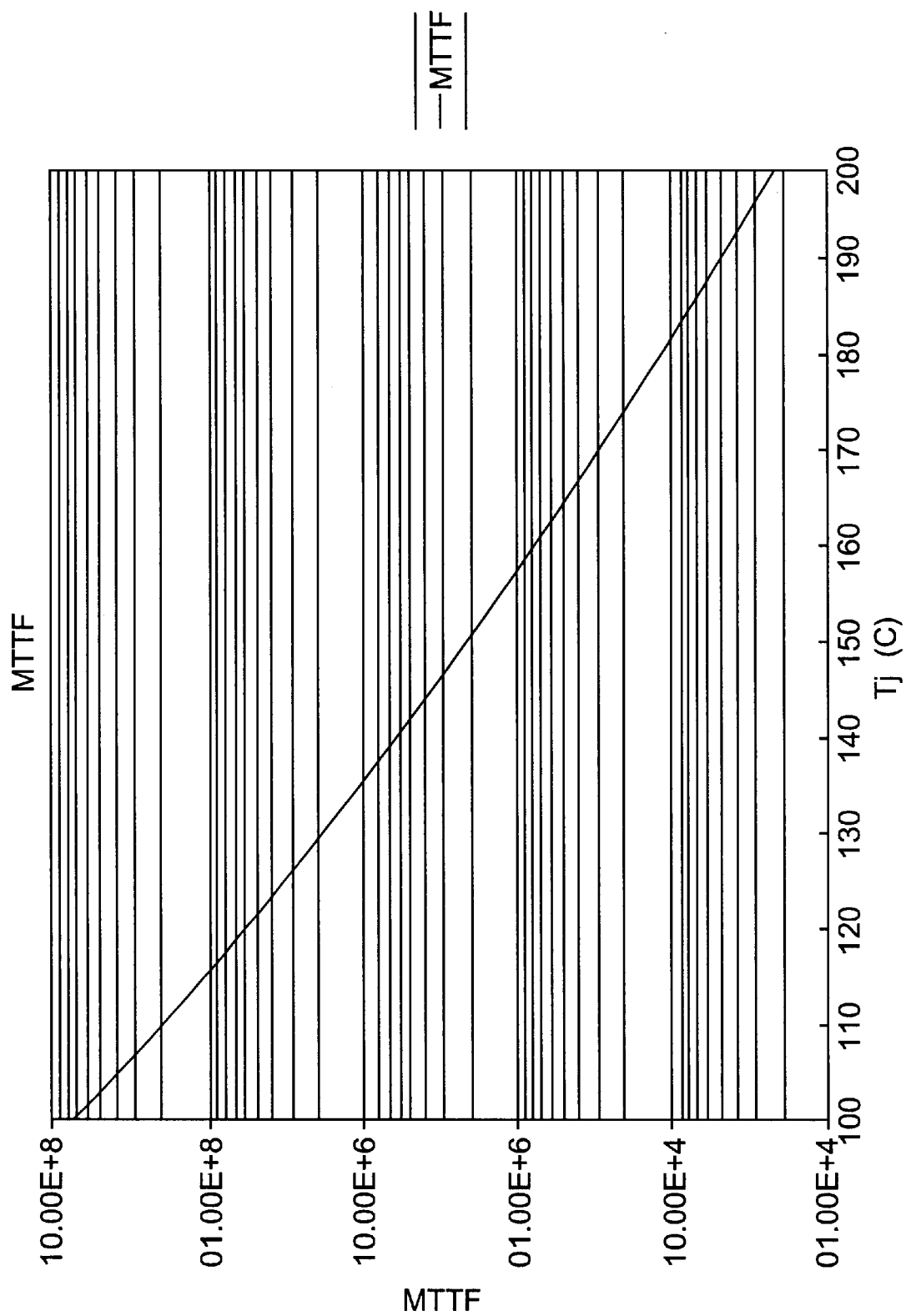
FIG. 3 is an illustration of a MTTF (Mean Time To Fail) as a function of junction temperatures of an exemplary semiconductor device in accordance with the principles of the present invention.

Accordingly, if the life time of the device is predicted to have $10^7$ life time points, the life time left for the device after two minutes of operation under 180° C. and two minutes of 1400 is $10^7$–8400–160=9,991,440 life time points, i.e., 120–10–4=106. As an example, the device 24 is a semiconductor device, wherein the temperature of the device is a junction temperature (Tj) of the semiconductor device. FIG. 3 shows the MTTF (hours) as a function of the junction temperature (Tj) of the semiconductor device.

Figure 4:
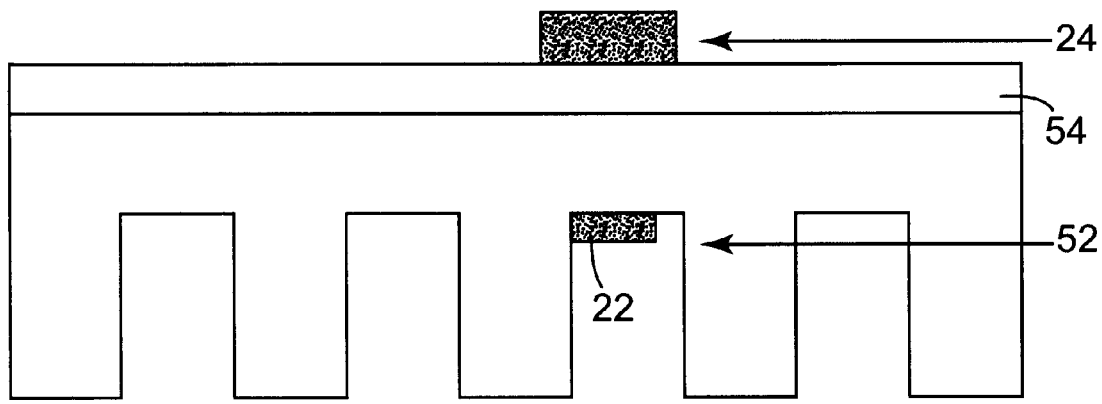
FIG. 4 is a schematic view of a temperature sensor sensing temperatures of a device, such as a power amplifier, disposed proximate to a power amplifier heat sink in accordance with the principles of the present invention.

In FIG. 4, the temperature sensor 22 is disposed proximate to the semiconductor device, e.g. a power amplifier. The power amplifier is disposed on a circuit board 52. A heat sink 54 is used to dissipate heat from the power amplifier. It is appreciated that the temperature sensor 22 can be placed in other suitable locations. For example, the sensor 22 can be mounted on the heat sink 54 or at a location near the circuit board 52. The sensor may also be directly attached to the device or on the other side of the circuit board directly below a hot component of the device. Further, it is appreciated that more than one sensor may be used if there are more than one hot component/device with low reliability.

The expected lifetime of a component may be based on temperature cycling data from the field. For example, several devices may be tested with different kinds of temperature cycles. A first scenario involves providing a constant, relatively high channel temperature and testing several components. In this first scenario, the average MTTF can be easily calculated for the tested devices and this value can be used for calculating the average lifetime point limit. In this scenario, lifetime points are simply used to conveniently model device "wear and tear".

A second scenario involves cycling the temperature over a wide range of temperatures and testing several components on similar temperature cycles. The lifetime points for each device are calculated based on actual measured channel temperature. This value can be used for calculating average lifetime point limit for tested temperature cycle pattern for several devices and the average lifetime point limit can be derived.

A third scenario involves cycling the temperature over a wide range of temperatures and testing several components on many different temperature cycles. The lifetime points for each device are calculated based on actual measured channel temperature. Such test results will demonstrate an average lifetime point limit for tested devices. If different temperature cycles are used, many devices are tested and the time in each temperature is recorded. Correction factors for lifetime points/unit time can be calculated to make the model more accurate.

A fourth scenario is an actual field test where devices in the field in the final application and environment are tested. In this scenario, temperature varies over a wide range and a large amount of devices (for example 1000–10,000 devices) are monitored and lifetime points are being calculated continuously. The time spent in each temperature is recorded as well as the calculated lifetime points. The model can be improved further based on the temperature vs. time data for failed units. The fifth scenario occurs when the mature technical status for the design is achieved. The fifth scenario involves testing actual devices in the field in the final application and environment, wherein the temperature varies over a wide range, a very large amount of devices are monitored and the lifetime points are calculated continuously. The time spent in each temperature is not recorded separately. Operators will accordingly know a typical behavior for device reliability and can replace units in critical locations before they fail according to typical reliability of the device or unit.

Accordingly, the present invention makes it possible to predict an actual life time for a device whose life time depends on the operating temperature. The present invention makes it possible to change the device before it fails and to gather more information about actual reliability and problems in the device for fixing them. Thus, the present invention provides a good tool for detecting possible problems in a system, e.g. a communication system at BTS (Base Transceiver Station). For example, if a cabinet for the device is located too close to the wall, it can be found that the reliability of the device is much worse.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A system of estimating a life time of a device, comprising:
   a temperature sensor, disposed proximate to the device, sensing temperatures of the device at a plurality of time intervals;
   a memory, coupled to the temperature sensor, recording the sensed temperatures; and
   a controller, coupled to the memory, to quantify a relationship between the sensed temperatures and an approximated expended life of the device over the corresponding time intervals as life time points, and to calculate accumulated life time points of the device based on an aggregation of the life time points to predict the life time of the device.

2. The system of claim 1, wherein for a temperature at an operation time of the device, the controller determines a life time left for the device.

3. The system of claim 2, wherein the life time points corresponding to each of the sensed temperatures are predetermined, the controller eliminating life time left for the device based upon the life time of the device and the life time points accumulated.

4. The system of claim 1, wherein the device is high power semiconductor.

5. The system of claim 4, wherein the high power semiconductor includes a heat sink, the temperature sensor being mounted on the heat sink of the high power semiconductor.

6. The system of claim 1, wherein the device includes a heat sink, the temperature sensor is mounted on the heat sink.

7. The system of claim 1, wherein the memory comprises a database, the database including life time data.

8. The system of claim 7 wherein the life time data is obtained from field tests.

9. The system of claim 7, wherein the memory comprises a model for modeling a life time of a device.

10. The system of claim 9, wherein the model and the database are based on real time data collection.

11. The system of claim 1, wherein the memory comprises a model for modeling a life time of a device.

12. A method of estimating a life time of a device, comprising:
   a) sensing temperatures of a device;
   b) recording the sensed temperatures of the device at a plurality of time intervals;
   c) determining life time points of the device corresponding to quantified relationships between the sensed temperatures and an approximated expended life of the device over the corresponding time intervals;
   d) calculating accumulated life time points of the device based on a sum of the life time points for the time intervals; and
   e) predicting a life time for the device based upon the accumulated life time points.

13. The method of claim 12, wherein the life time points corresponding to the sensed temperatures are predetermined, the life time left for the device being determined from the life time of the device and the life time points accumulated.

14. A method of estimating a life time of a device, comprising:
   a) sensing temperatures of a device by a temperature sensor;
   b) recording the temperatures of the device at a plurality of time intervals;

c) determining life time points of the device corresponding to the temperatures;

d) calculating accumulated life time points of the device for the time intervals; such that a life time of the device is predicted;

e) predicting a life time for the device based upon the accumulated life time points; and f) determining whether the accumulated life time points of the device have reached critical life time points of the device: if yes, replacing the device with a new device; if no, continuing steps a)–f).

15. An article of manufacture for a computer-based estimating system for estimating a life time of a device, the article of manufacture comprising a computer readable medium having instructions for causing a computer to perform a method comprising:

a) sensing a temperature of a device;

b) recording the sensed temperatures of the device at a plurality of time intervals;

c) determining life time points of the device corresponding to quantified relationships between the sensed temperatures and an approximated expended life of the device over the corresponding time intervals;

d) calculating accumulated life time points of the device based on a sum of the life time points for the time intervals; and e) predicting a life time for the device based upon the accumulated life time points.

* * * * *